United States Patent [19]

Kobunaya

[11] Patent Number: 5,249,213
[45] Date of Patent: Sep. 28, 1993

[54] CIRCUIT FOR COUNTING THE NUMBER OF CROSSED OVER TRACKS BY AN OPTICAL HEAD IN OPTICAL DISK APPARATUS

[75] Inventor: Hideki Kobunaya, Tokyo, Japan
[73] Assignee: NEC Corporation, Japan
[21] Appl. No.: 791,993
[22] Filed: Nov. 14, 1991
[30] Foreign Application Priority Data
  Nov. 15, 1990 [JP] Japan .................. 2-309599
[51] Int. Cl.⁵ .................. G11B 7/00; G06M 3/00
[52] U.S. Cl. .................. 377/39; 369/44.28; 369/44.34
[58] Field of Search .......... 369/44.28, 44.34; 377/39

[56] References Cited
U.S. PATENT DOCUMENTS 4,716,557 12/1987 Utani .................. 369/44.28
5,073,885 12/1991 Ito et al. .................. 369/44.28
5,157,645 10/1992 Takahara et al. .................. 369/44.34

*Primary Examiner*—John S. Heyman
*Attorney, Agent, or Firm*—Laff, Whitesel, Conte & Saret

[57] ABSTRACT

In an optical disk apparatus, a circuit for counting the number of tracks crossed by an optical head comprises a first storage means for storing a sampling value obtained for each predetermined sampling cycle, a second storage means for storing a sampling value obtained for the immediately preceding sampling cycle and a comparator means for comparing the first and second values each stored within said first and second storage means. If the value obtained by this comparator means is smaller than a predetermined value, then the first value is selected as the count of the number of crossed tracks, and if the opposite is the case, then the second value is selected as such.

4 Claims, 4 Drawing Sheets

CIRCUIT FOR COUNTING THE NUMBER OF CROSSED OVER TRACKS BY AN OPTICAL HEAD IN OPTICAL DISK APPARATUS

BACKGROUND OF THE INVENTION

1. Field of the Invention:

The present invention relates to a circuit for counting the number of tracks of an optical disk crossed over by an optical head in an optical disk apparatus.

2. Prior Art:

FIG. 4 illustrates a conventional circuit for counting the number of tracks crossed over by the optical head, in which a tracking error signal 1 representing a deviation of the optical head from the track is converted into, for example, a binary signal by a binarization circuit 2, which signal is counted by a counter 3. The counted value is stored in a register 5 for each sampling cycle indicated by a sampling signal 4 and, at the same time, the value of the counter 3 is reset. Thus, the count of the number of the crossed tracks for each sampling cycle is stored in the register 5.

Next, a seeking operation (which means movement of the head from one track to another) by using the counted number of crossed tracks is described. During the seeking operation, control of the head speed is conducted. That is, in order to carry out an optimum seeking operation, a current head speed V is controlled so as to follow a target speed $V_p$. In addition, since the count of the crossed track number for a single sampling cycle is the number of tracks by which the head advances within a predetermined period of time, this value can be translated into speed and, from the count of the number of crossed tracks for each sampling cycle, the head speed V for each sampling cycle can be evaluated. Here, the head is controlled so that $V_p - V$ may become small (If the head speed V is smaller than the target speed $V_p$, then a positive force corresponding to this difference is applied to the head. On the other hand, if V is larger than $V_p$, then a negative force corresponding to this difference is applied to the head.), and, when V becomes sufficiently small and the number of tracks crossed over by the head, which is evaluated by summing the counts of crossed tracks for each sampling cycle, reaches the target number of tracks to be sought, the seek operation is completed.

However, the above-described conventional circuit for counting the number of crossed tracks has a drawback that, when the optical head crosses a mirror section, preformatting section and a defective section (for example, about 2700 byte preformatting section is crossed over in the access of 6000 tracks), the tracking error signal is lost, resulting in the count error of the number of crossed tracks. Once this count error occurs, the number of crossed tracks is counted less than the actual value, and the head speed would be recognized smaller than the actual head speed and, as the result, a force stronger than necessary is applied to the head, which can cause the head to race. In addition, the count error of the number of crossed tracks causes inaccurate counting of the number of crossed tracks, which makes the seeking error or a positional difference between the target track and the head position at the end of seeking greater.

SUMMARY OF THE INVENTION

It is an object of the present invention to provide a circuit for counting the number of crossed tracks which can decrease or eliminate the count error of the number of crossed tracks.

According to the present invention, there is provided a circuit for counting the number of tracks of an optical disk crossed over by an optical head comprising:

a counter for counting the number of tracks crossed by the optical head for each predetermined sampling cycle;

a first storage means for storing a count in the counter for the current sampling cycle;

a second storage means for storing a count in the counter for at least one of the preceding sampling cycles;

a comparator means for comparing the values stored within the first storage means with the value corresponding to the count for the preceding sampling cycle or cycles obtained from the value stored within the second storage means to emit a signal when a difference between both values is greater than a predetermined value; and a selector controlled by the output of the comparator means so that, when the signal from the comparator means is not emitted, the value stored within the first storage means is selected, and when the signal is emitted therefrom, an output of the second storage means is selected.

Preferably, the count circuit includes a second storage means which stores a plurality of values each representing the number of crossed tracks for a plurality of preceding sampling cycles, and an averaging means for evaluating the mean value of the plurality of values stored within this second storage means so that the value emitted therefrom is compared with the value retained by the first storage means, which represents the count of the current number of crossed tracks, by the comparator.

According to a preferred embodiment of this invention, there is provided a differentiator which evaluates a difference between the count of crossed tacks for the current sampling cycle and that for the immediately preceding sampling cycle, the value emitted from the differentiator being supplied to the second storage means. A plurality of values retained within this second storage means is averaged by the averaging means, and the resulting value is added to the count of crossed tracks for the immediately preceding sampling cycle and the count of the number of crossed tracks for the past sampling cycle. The sum thus obtained is compared with the current count of crossed tracks. If the difference is greater than a predetermined value, then the sum is adopted as the current count of crossed tracks.

In the circuit according to the present invention, the count of crossed tracks for the current sampling cycle is predicted from the past count of the number of crossed tracks and, if this predicted value and the actual current count of the number of crossed tracks greatly deviates, then it is regarded that there was a count error, and this predicted value is interpolated as the current number of crossed tracks to reduce the count error. Therefore, racing of the head can be suppressed to reduce the seeking error.

The present invention will be better understood from the following description regarding the preferred embodiments in conjunction with the accompanying drawings.

DETAILED DESCRIPTION OF THE PREFERRED EMBODIMENTS

Figure 1:
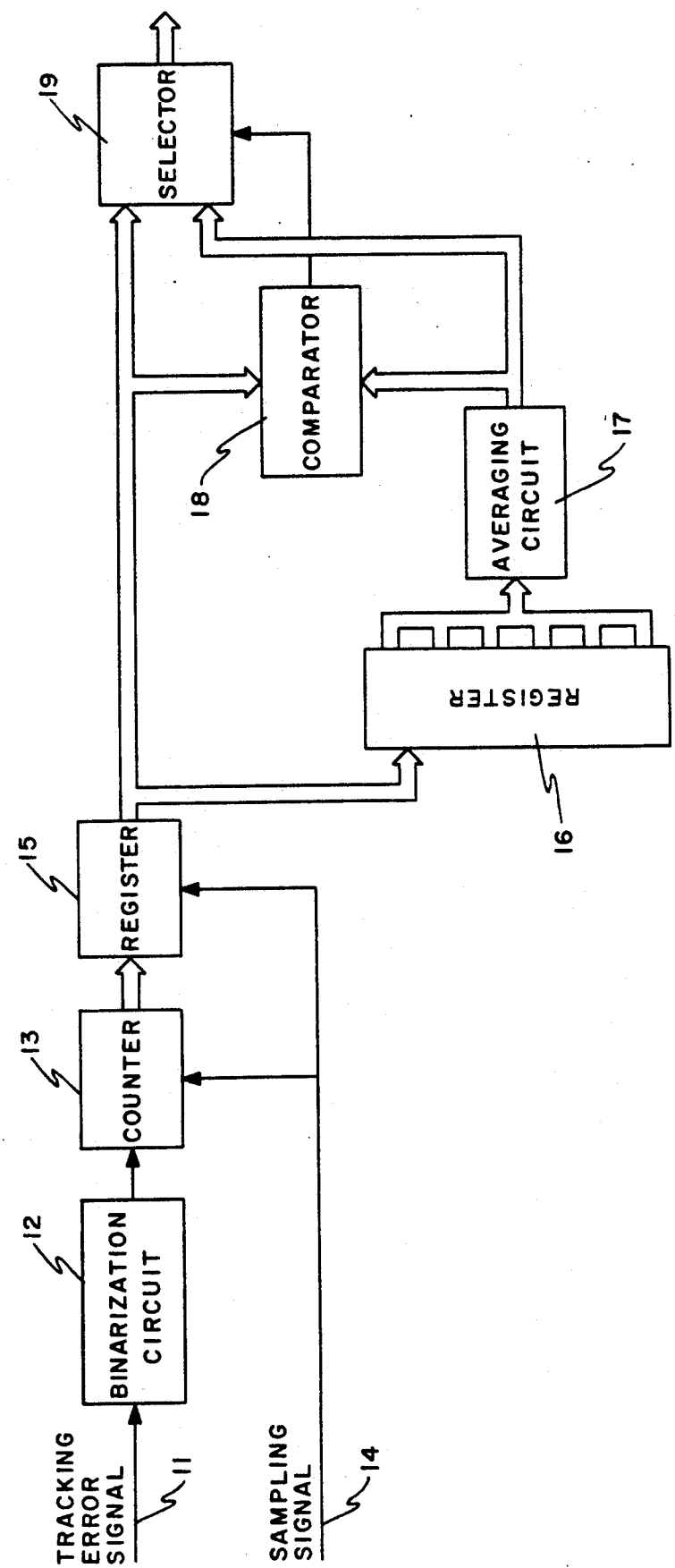
FIG. 1 is a block diagram illustrating a circuit for counting the number of crossed tracks as the optical head crosses over the tracks of the optical disk embodying the present invention.

Referring to FIG. 1 illustrating a block diagram of a circuit for counting the number of crossed tracks according to the present invention, the circuit comprises a binarization circuit 12 into which a tracking error signal 11 indicating a displacement of the optical head from the track is entered. The output of the binarization circuit is counted in a counter 13 connected thereto. To the output of the counter 13 is connected a register 15 for storing a count for the current sampling cycle, and to the output of this register 15 is connected a register 16 which comprises a plurality (six in this embodiment) of units for storing the count for the current sampling cycle. Within each unit of the register 16, the count for each of the past six sampling cycles is stored and is sequentially updated as the sampling is conducted anew. The counter 13 and the register 15 are reset at each time when the sampling signal 14 representing the sampling cycle is supplied.

To each register 16 an averaging circuit 17 for obtaining a mean value of these outputs is connected. A comparator 18 compares the value of the register 15 and the output of the averaging circuit 17 and, based on the result of averaging, a selector 19 is controlled so as to select either one of the outputs of the register 15 and the circuit 17.

In this embodiment, a tracking error signal 11 representing the displacement of the optical head from the track is converted into a binary signal in the binarization circuit 12, and the binary signal is counted by a counter 13. For each sampling cycle, the value stored within the register 15 is transferred to a register 16 and, thereafter, the value of the counter 13 is stored in the register 15 as a new value and then the value of the counter 13 is reset. That is, within the unit of the register 16, the counts for the past six sampling cycles are stored, respectively, and the count of the current sampling cycle is stored in the register 15.

The output of the register 16 is used in the averaging circuit 17 to calculate a mean value of the counts for the past six sampling cycles, which are stored within the units. The mean value is compared with the value retained within the register 15 at a comparator 18. If the difference therebetween is greater than a predetermined value, then output of the comparator 18 is fed from the comparator 18 to the selector 19, where the mean value from the averaging circuit 17 is selected and this value is emitted as the current count. Otherwise, if the difference between the mean value calculated at the averaging circuit 17 and the value retained in the register 15 is smaller than the predetermined value, then the comparator 18 does not emit the output to the selector 19 but, with this state, the selector selects the value retained within the register 15.

Figure 2:
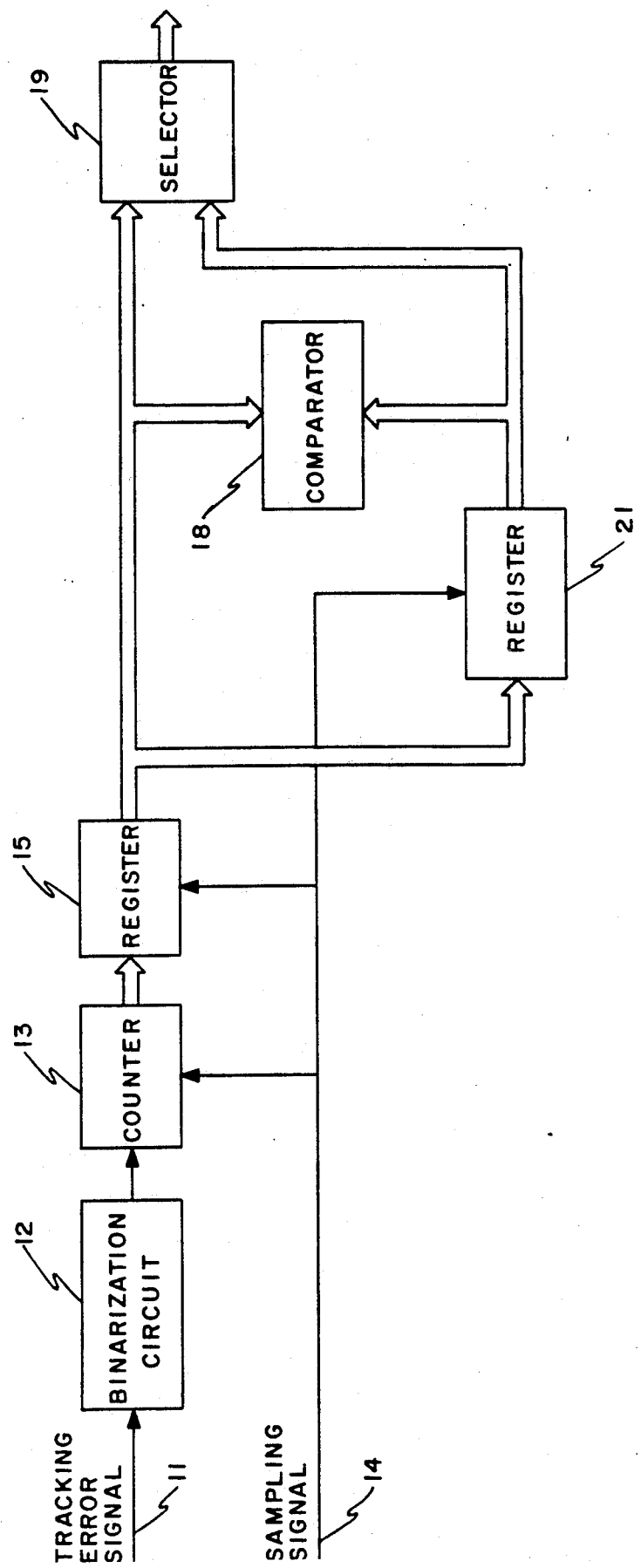
FIG. 2 is a block diagram illustrating another circuit embodying the present invention.

FIG. 2 is a block diagram illustrating the count circuit according to another embodiment of the present invention. Referring to FIG. 2, in which the same or similar parts as in FIG. 1 are indicated by the same reference numerals, the tracking error signal 11 is entered into the binarization circuit 12, as in the circuit of FIG. 1. To the binarization circuit is connected a counter 13 for counting its output. The output of the counter 13 is connected to a register 15 for storing the count for the current sampling cycle. To the register 15 is connected to a register 21 which is provided for storing the count for the sampling cycle preceding the former by one is connected. The comparator 18 compares the values stored within the registers 15 and 21 for controlling the selector 19 in accordance with the result of the comparison to emit either one of the values of the registers 15 and 21.

In the embodiment of FIG. 2, the tracking error signal 11 representing the displacement of the optical head from the track is converted into a binary signal by the binarization circuit 12, which signal is counted at the counter 13. In addition, for each sampling cycle, the value stored within the register 15 is transferred to the register 21 while the value of the counter 13 is stored in the register 15 and the counter 13 is reset. That is, within the register 21, the count for the immediately preceding sampling cycle is stored. Next, the values of the registers 21 and 15 are compared at the comparator 18 and, if the difference therebetween is greater than a predetermined amount, then the value of the register 21 is selected by the selector 19 and is emitted as the count at the present cycle. That is, the count for the preceding sampling cycle interpolates the output value as the count for the current sampling cycle.

Figure 3:
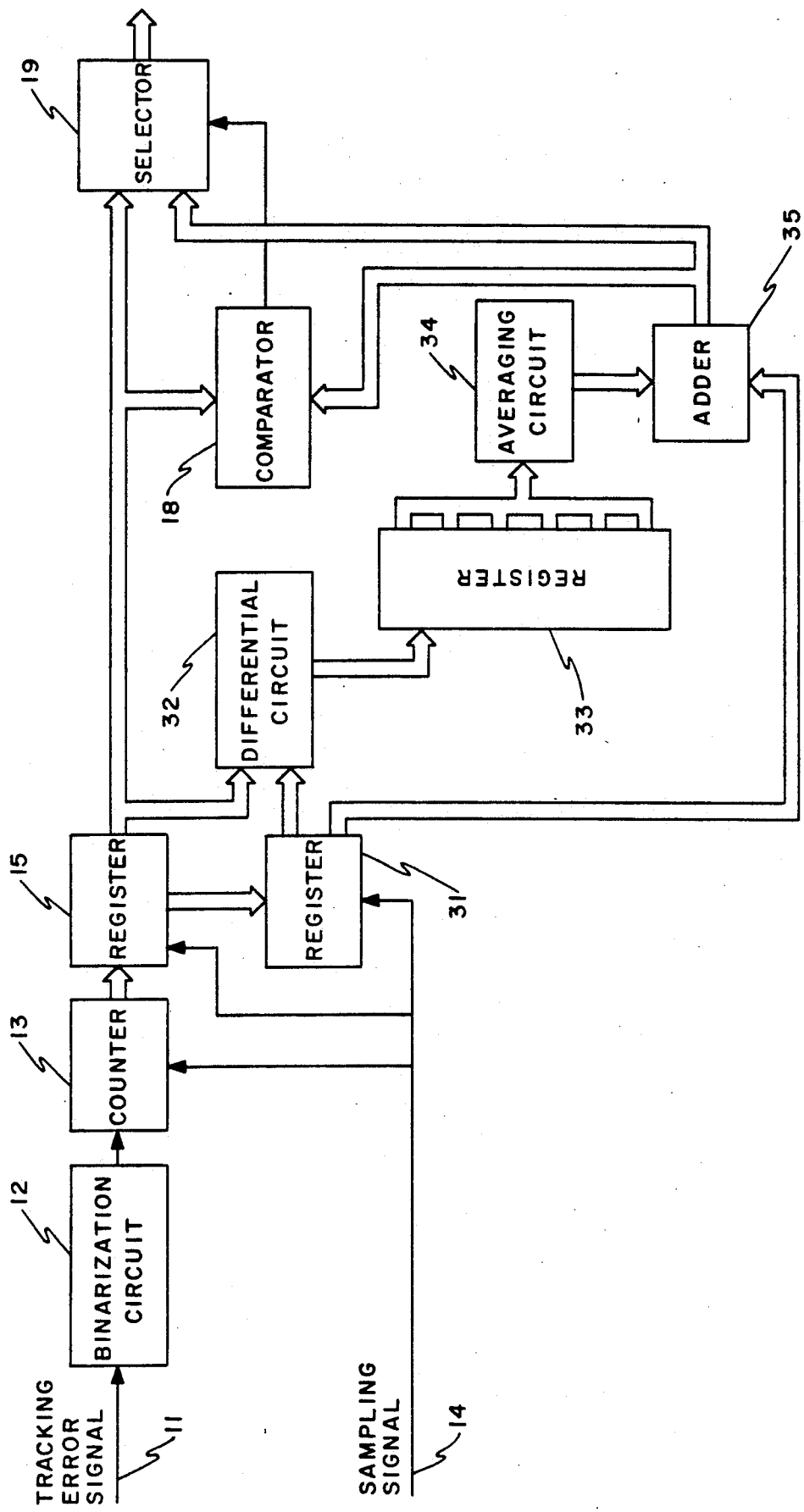
FIG. 3 is a block diagram illustrating a further circuit embodying the present invention.
Figure 4:
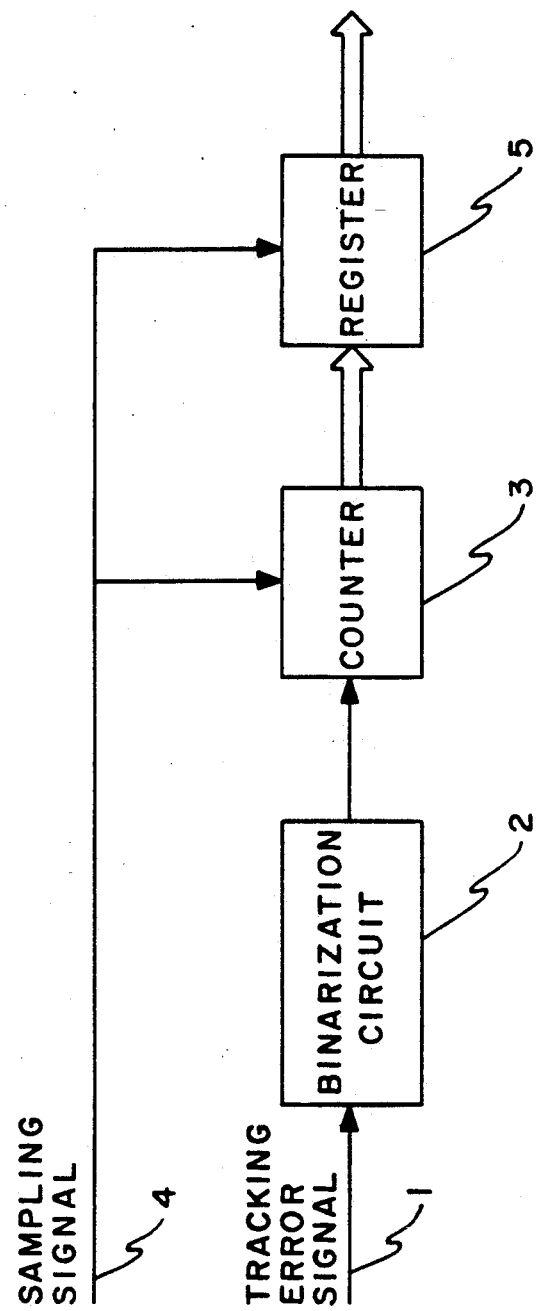
FIG. 4 is a block diagram illustrating a conventional circuit.

FIG. 3 is a block diagram illustrating the count circuit for a still another embodiment of the present invention. In FIG. 3, the same or similar parts as in FIG. 1 are indicated by the same reference numerals. Referring to FIG. 3, a binarization circuit 12, into which the tracking error signal 11 is entered, a counter 13 for counting the output of the binarization circuit and a register 15 for storing the count for the current sampling cycle are the same as those shown in FIGS. 1 and 2.

In the embodiment of FIG. 3, a register 31 for storing the count for the immediately preceding sampling cycle is connected to the register 15. The outputs of the registers 15 and 31 are connected to a differential circuit 32, which evaluates a difference between the values each retained within the registers 15 and 32.

The output of the differential circuit 32 is connected to the next stage register 33. The register 33, as in the register 16 of FIG. 1, comprises a plurality (for example, six) of units, within each of which the counts for the past six sampling cycles are stored and are sequentially updated each time the sampling is conducted anew. To each unit of the register 32, an averaging circuit 34 for evaluating the mean value of the values each retained within each unit is connected and the output of this averaging circuit is connected to an adder 35. To another input of the adder 35, the output of the register 31 is connected. At the adder 35, a sum of the value retained within the register 31 and the mean value obtained at the averaging circuit 34 is evaluated.

The comparator 18 compares the value retained within the register 15 with the output value of the adder 35 and, based on this result, either one of them is selected and emitted by a selector 19.

In this embodiment, the tracking error signal 11 representing the displacement of the optical head from the track is converted into a binary signal at the binarization circuit, which signal is counted by the counter 13. In addition, for each sampling cycle, the value stored within the register 15 is transferred to the register 31 and, then the value of the counter 13 for the next sampling cycle is stored into the register 15 before the value of the counter 13 is reset. This process is repeated. In consequence, within the register 31, the count for the immediately preceding sampling cycle is stored and the count for the current cycle is stored in the register 15.

Next, at the differential circuit 32, a difference between the values retained by the registers 31 and 5, that is, a variation between the counts for the current sampling cycle and that preceding the same by one is evaluated, and this value is sequentially stored in each unit of the register 33. That is, into the register 33, the variations between the counts for the past six sampling cycles are stored. In addition, the mean of these variations is evaluated at the averaging circuit 43 and, at the adder 13, a sum of this mean and the count for the preceding sampling cycle is evaluated. The output of this adder is a predicted value of the count for the current sampling cycle.

The actual current count stored within the register 5 and the predicted current count are compared in the comparator 18, and, if that difference is greater than a predetermined value, then the output of the adder 13 is selected at the selector 19, and this is emitted as the current sampling value. That is, the predicted count is adopted as the predicted value of the count for the current sampling cycle, and an abrupt change of the tracking error signal is thereby compensated for.

As described above, according to the present invention, the count of the number of crossed tracks for the current sampling cycle is predicted from the count of the same for the past sampling cycles and, if this predicted value and the actual count for the current number of crossed tracks greatly deviates, then it is regarded that the number was miscounted and, by interpolating this predicted value as the current count of crossed tracks, a possibility of miscounting of the crossed tracks can be reduced, to thereby suppress racing of the head to lessen the seeking error.

What is claimed is:

1. A circuit for counting the number of tracks of an optical disk crossed over by an optical head comprising:
   a sampling signal having predetermined sampling cycles;
   a counter for counting the number of tracks crossed by said optical head for each predetermined sampling cycle applied thereto by said sampling signal;
   a first storage means for storing a count in said counter for the current sampling cycle applied thereto by said sampling signal;
   a second storage means for storing a count in said counter for at least one of the preceding sampling cycles;
   a comparator means for comparing the values stored within said first storage means with the value corresponding to the count for the preceding sampling cycle or cycles obtained from the value stored within said second storage means to emit a signal when a difference between both values is greater than a predetermined value; and
   a selector controlled by the output of said comparator means so that, when said signal from the comparator means is not emitted, the value stored within said first storage means is selected, and when said signal is emitted therefrom, an output of said second storage means is selected.

2. A circuit for counting the number of tracks of an optical disk crossed over by an optical head comprising:
   a sampling signal having predetermined sampling cycles;
   a counter for counting the number of tracks crossed by said optical head for each predetermined sampling cycle applied thereto by said sampling signal;
   a first storage means for storing a count in said counter for the current sampling cycle applied thereto by said sampling signal;
   a second storage means for storing a count in said counter for the immediately preceding sampling cycle;
   a comparator means for comparing the values each stored within said first and second storage means to emit a signal when a difference between both values is greater than a predetermined value; and
   a selector controlled by the output of said comparator means so that, when said signal from the comparator means is not emitted, the value stored within said first storage means is selected, and when said signal is emitted therefrom, an output of said second storage means is selected.

3. A circuit for counting the number of tracks of an optical disk crossed over by an optical head comprising:
   a sampling signal having predetermined sampling cycles;
   a counter for counting the number of tracks crossed by said optical head for each predetermined sampling cycle applied thereto by said sampling signal;
   a first storage means for storing a count in said counter for the current sampling cycle applied thereto by said sampling signal;
   a second storage means for storing counts in said counter for a plurality of past sampling cycles;
   an averaging means for evaluating a mean of the plurality of values stored within said second storage means;
   a comparator means for comparing the mean obtained by said averaging means and the number of crossed tracks for the current sampling cycle, which is stored within said first storage means, to emit a signal when a difference therebetween is greater than a predetermined value; and
   a selector controlled by the output of said comparator means so that, when said signal from the comparator means is not emitted, the value stored within said first storage means is selected and, when said signal from the comparator means is emitted, an output of said averaging means is selected.

4. A circuit for counting the number of tracks of an optical disk crossed by an optical head comprising:
   a sampling signal having predetermined sampling cycles;
   a counter for counting the number of tracks crossed by said optical head for each predetermined sampling cycle applied thereto by said sampling signal;
   a first storage means for storing a count in said counter for the current sampling cycle applied thereto by said sampling signal;
   a second storage means for storing a count in said counter for the immediately preceding sampling cycle;

a differential circuit for evaluating a difference between the values each stored with said first and second storage means;

a third storage means for storing a plurality of values evaluated by said differential circuit for each of a plurality of past sampling cycles;

an averaging means for evaluating a mean of the plurality of values which are stored within said third storage means;

an adder for evaluating a sum of the mean obtained at said averaging means and the value stored within said second storage means;

a comparator means for comparing the output value of said adder and the number of crossed tracks for the current sampling cycle, which is stored within said first storage means, to emit a signal when a difference therebetween is greater than a predetermined value; and a selector controlled by the output of said comparator means so that, when said signal from the comparator means is not emitted, the value stored within said first storage means is stored is selected, and when said signal from the comparator means is emitted, the output of said averaging means is selected.

* * * * *